United States Patent Office 3,746,632
Patented July 17, 1973

3,746,632
APPARATUS FOR ELECTROCHEMICAL PROCESSING OF METALLIC WORKPIECES
Günther Kühdorf, Stuttgart, and Joachim Berndt, Stuttgart-Möhringen, Germany, assignors to Robert Bosch GmbH, Stuttgart, Germany
Filed Oct. 20, 1971, Ser. No. 190,945
Claims priority, application Germany, Oct. 21, 1970,
P 20 51 710.6
Int. Cl. B23p 1/02
U.S. Cl. 204—224
8 Claims

ABSTRACT OF THE DISCLOSURE

A plurality of working stations is provided, each having a working electrode on which a metallic workpiece is to be held in predetermined orientation. Passages are provided on each working station for conducting a liquid electrolyte into contact with the electrode and the workpiece. A source of supply supplies liquid electrolyte at a predetermined level of pressure to the passages of all of the working stations, and the outflow of used electrolyte from the respective working stations is controlled by elements associated with the working stations which maintain the pressure substantially constant even if at one or more of the working stations a workpiece should be missing during operation of the other working stations.

BACKGROUND OF THE INVENTION

The present invention relates generally to an apparatus for the electrochemical processing of metallic workpieces, and more particularly to such an apparatus on which a plurality of such metallic workpieces are to be electrochemically processed simultaneously.

In the electrochemical processing of metallic workpieces metal is removed from the workpiece by contacting a working electrode and a metallic workpiece with a liquid electrolyte, usually circulated under pressure, while establishing between the working electrode and the workpiece a flow of electrical current of high capacity. The electrode is so profiled that its contour is the opposite (positive or negative) of the shape to be produced by material-removal from the workpiece. The workpiece is connected to the positive pole (anode) and the working electrode to the negative pole (cathode) of a source of direct current and in this manner recesses, openings and the like can be produced in metallic workpieces in a brief span of time and in a highly advantageous manner. Of course, during such operation the width of the so-called working gap, that is the distance between the electrode and the workpiece through which the electrolyte circulates, must be maintained at least substantially constant for which purpose the electrode and the workpiece are so associated with one another that they can be moved towards or away from one another as required.

An extension of this approach to metal working is represented in apparatus for producing in metallic workpieces by electrochemical means grooves with precisely defined contours. In these apparatuses—contrary to the ones mentioned before—the relative position of workpiece and working electrode need not be varied during the electrochemical removal of anodic material, that is of material from the metallic workpiece. However, if the contours of the groove being formed are to be precisely defined, the accuracy of this definition depends not only upon the voltage and potential of the current, but also upon the period of time during which the apparatus acts upon the workpiece, the electrode form and the width of the working gap. In addition, and to a very significant extent, the accuracy with which the contours of a groove being formed in the workpiece can be controlled depends in these machines upon the speed and thus upon the pressure of the electrolyte which flows through the working gap. Experience has shown that it is difficult to form grooves in a workpiece which correspond precisely in shape to a contour of the working electrode, if the electrolyte circulates through the working gap at low speed. It is, therefore, essential that the necessary pressure for the electrolyte—and hence the flow speed thereof—be readily controllable in such apparatuses, a requirement which can be met without difficulty if the apparatus has only a single working station in which a single workpiece is being processed at a time.

Problems arise, however, if such apparatus is to be capable of processing a plurality of workpieces simultaneously, that is if the processing of these workpieces is to be part of a series production. On the other hand, this approach is of course dictated in modern manufacturing installations by considerations of production economy. Under circumstances where an electrochemical apparatus processes a plurality of workpieces simutlaneously, it is still necessary that the pressure and flow speed of the liquid electrolyte in the working gap be maintained at least substantially constant. Here, however, the supply pressure of the electrolyte must of course be maintained substantially constant at each and every one of the working stations in which a plurality of workpieces are simultaneously being processed. If all working stations of such an apparatus are in use simultaneously, that is if each of the working stations processes a workpiece at the same time that all the other stations process respective workpieces, then the probelm is not difficult to handle as long as the pressure at which the electrolyte is supplied is maintained constant. Unfortunately, it is not always avoidable that one or more of the working stations do not process a workpiece at a time at which others of the working stations do in fact process such a workpiece. If this occurs, the increased pressure drop of the electrolyte in the working stations where the workpiece is missing, will result in a significant reduction of the electrolyte supply pressure. This means that the electrolyte supplied to the working stations which are at that time acting upon a workpiece, will not be at the required pressure and will not circulate at the required speed, so that the necessary precision of material removal on such workpieces is no longer assured.

Of course, the problem here involved does not pose insuperable difficulties, because it is entirely possible to install suitable regulating devices in the electrolyte circuit and to thus obtain the necessary near-constancy of electrolyte pressure even under the conditions outlined above. This would, in fact, appear to be an answer which suggests itself immediately the problem is posed. That this answer has not found any practical acceptance is due to the fact that the installation of such regulating devices would make a machine of the type in question so expensive in its construction—and also in its maintenance—as to render this approach to the removal of material in workpieces economically no longer feasible.

SUMMARY OF THE INVENTION

In consideration of what has been set forth above with respect to the prior art, it is a general object of the present invention to provide an improvement over the state of the prior art.

More particularly it is an object of the persent invention to provide an improved apparatus of the type here under discussion, which achieves the aforementioned requirements in a much more simple and inexpensive manner than anything that is known from the prior art.

In pursuance of these above objects, and of others which will become apparent subsequently, one feature of the invention resides in an apparatus of the character described, particularly for the simultaneous electrochemical processing of a plurality of metallic workpieces. Briefly stated, this apparatus comprises a plurality of working stations each of which has a working electrode, holding means for holding a metallic workpiece in predetermined orientation relative to the working electrode, and passage means for conducting a liquid electrolyte into contact with the electrode and the workpiece. A source of supply supplies liquid electrolyte at a predetermined level of pressure to the passage means of all of the working stations simultaneously. Control means is associated with each of the working stations and is operative for maintaining the pressure electrolyte in the passage means at least substantially at the predetermined level irrespective of the presence or absence of a workpiece at the working station.

This control means is, in accordance with the present invention, a cover which so limits the cross-section of the outlet of the electrolyte from the respective working station, that even if at the respective working station a workpiece is not present, the level of pressure at which electrolyte is supplied to the remaining working stations where a workpiece is in fact present does not decrease to a significant extent.

According to a concept of the invention it is particularly advantageous if the cover is in form of a substantially cylindrical downwardly open hood whose lower edge defines, together with the mount of the working electrode, an annular gap for outflow of the electrolyte during the period of time at which the apparatus is in operation.

The novel features which are considered as characteristic for the invention are set forth in particular in the appended claims. The invention itself, however, both as to its construction and its method of operation, together wtih additional objects and advantages thereof, will be best understood from the following description of specific embodiments when read in connection with the accompanying drawing.

DESCRIPTION OF THE PREFERRED EMBODIMENTS

Figure 1:
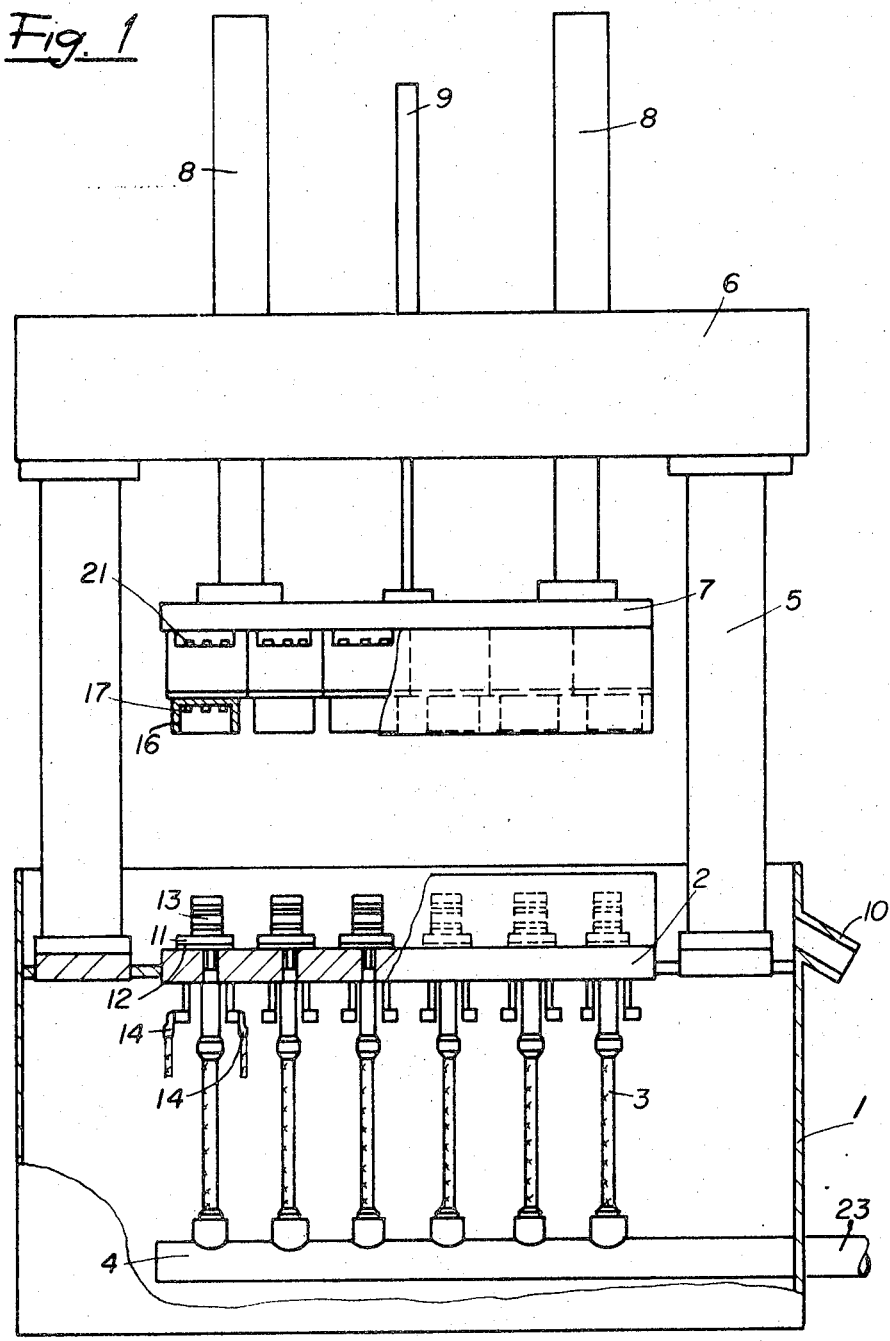
FIG. 1 is a somewhat diagrammatic, partly sectioned and partly broken away front-elevational view of an apparatus according to the present invention, showing the working stations in the absence of workpieces.

Discussing firstly FIG. 1 it will be understood that the apparatus is illustrated in simplified form, showing only those features which are essential for an understanding of the present invention and omitting features which are not essential and would only confuse the illustration.

With this in mind it is pointed out that reference numeral 1 in FIG. 1 identifies a frame of the apparatus, or a housing or the like, with the element 1 having a support 2 and six inlet conduits 3 for electrolyte which is supplied under pressure to the conduits 3 by a distributor 4 which in turn receives electrolyte from a supply conduit 23.

There are further provided two upright supports 5 which are connected in the region of their upper ends by a traverse member 6. A movable unit 7 is suspended onto further upright guides 8 and connected with a hydraulically operated raising and lowering device 9, such as a cylinder and piston unit which is known per se and requires no detailed discussion. The purpose of the unit 9 is, of course, to raise and lower the unit 7 and during such movement the unit is guided by the uprights 8 which are suitably mounted in the traverse 6. Reference numeral 10 identifies an outlet at which spent electrolyte, that is electrolyte which has circulated through the respective working stations of the apparatus, can leave the apparatus.

Provided on the support or table 2 is a plurality—in this instance six—of electrode mounts 11. In order to obtain a better electrical contact each of the mounts 11 is supported on a brass plate 12. Each of the mounts 11 further carries a working electrode 13 which are all identical in the various working stations. The brass plates 12 are each connected by means of two cables 14 with the negative pole (cathode) of a non-illustrated source of direct current. The composition of the working electrodes 13 is shown by way of example in FIG. 2, and it will be appreciated that in accordance with the practice which is well known from the art the electrodes 13 are constructed in sandwich form, being composed of electrically conductive and electrically non-conductive components with electrically conductive material being exposed only at those locations where the removal of material from the workpiece 15 (the anode) is to be effected. At all other locations electrically insulating material prevents the exposure of the electrically conductive material of the working electrode.

Figure 2:
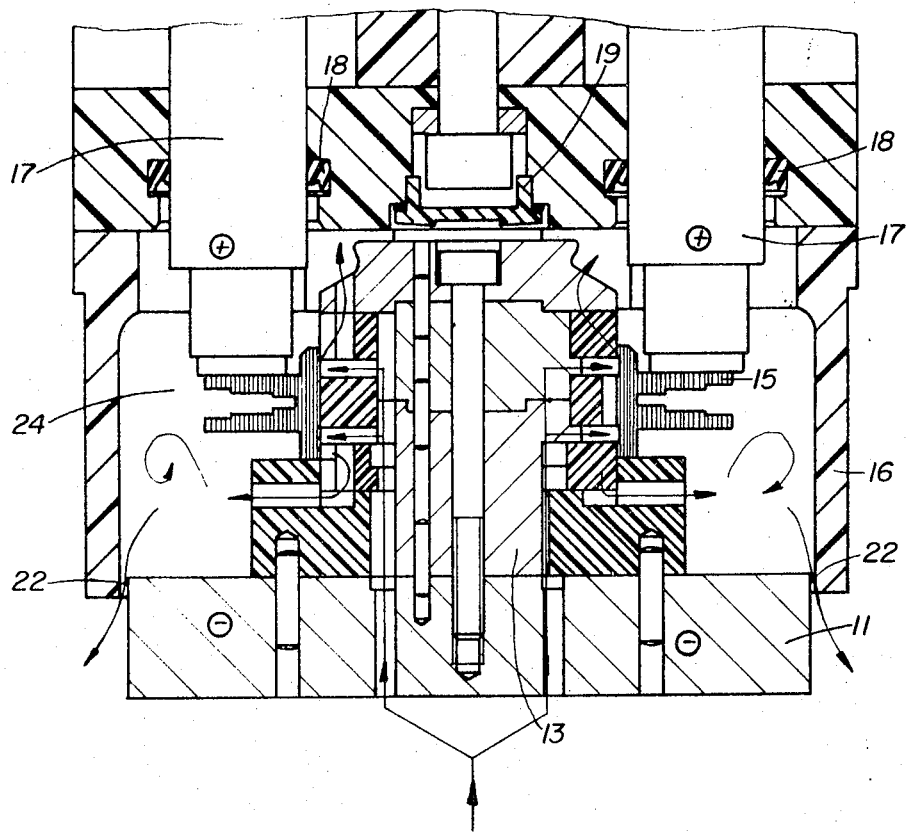
FIG. 2 is a fragmentary sectioned detail view, on an enlarged scale, showing one of the working stations of the apparatus in FIG. 1 during operation and with the workpiece in place.

With reference now to FIG. 2 it is pointed out that in this detail view which shows one of the six working stations of the apparatus of FIG. 1, a workpiece 15 is placed about the working electrode 13. This workpiece is here illustrated as an internally toothed gear, the purpose of its processing being to remove material in order to form grooves with precisely defined contours in the flanks of the individual teeth of the gear 15. Of course, the particular type of workpiece here illustrated is intended only as an example.

Each of the working stations comprises a cover 16, here illustrated as a downwardly open, substantially cylindrical hood of which six are provided which are mounted on the unit 7 as illustrated in FIG. 1. The hoods are composed in this embodiment of hard polyvinylchloride but of course could be of other suitable material. Located within the confines of each hood there are further provided four contact bolts or members 17 which are arranged in a substantially star-shaped pattern and whose lower end portions are exposed in the interior of the respective hood 16 whereas their upper end portions 21 are connected in non-illustrated manner with the positive pole (anode) of the non-illustrated source of direct current.

A consideration of FIG. 2 will indicate that the upper end of each of the hoods 16 is provided with apertures through which the bolts 17 extend, as well as with a recess into which the free upper end of the working electrode 13 can enter. The hoods 16 are liquid-tightly connected at the underside of the unit 7, and where the bolts 17 pass out of the unit 7 liquid seals 18 are provided. All other openings in the unit 7 are closed with suitable plugs 19 against entry of liquid electrolyte.

The construction of all working stations of the apparatus in FIG. 1, including the hoods 16 and the associated components, is the same.

The apparatus illustrated can process six workpieces at a time, one in each of the working stations. When the hoods are in the raised position shown in FIG. 1, the respective workpieces 15 are inserted into the working stations, by placing each workpiece about one of the working electrodes 13 in the manner illustrated in FIG. 2. Thereupon the unit 7 is lowered until each hood 16 reaches the position shown in FIG. 2 with respect to the associated working electrode 13 and the mount 11 thereof. As illustrated, in the lower position the lower free edge of the hood 16 overlaps by some millimeters the upper edge of the electrode mount 11, defining therewith an annular gap 22 of limited cross-section. In addition, in the lower position of the hoods the lower ends of the contact elements 17 engage the workpiece 15 in the illustrated manner, holding the workpiece 15 against displacement and at the same time establishing an electrically conductive connection between the workpiece and the positive pole of the source of electrical energy. Furthermore, a reliable retention of the workpiece 15 against movement is assured by the precisely corresponding contours of the workpiece interior on the one hand and the electrically insulating portions of the working electrode 13 on the other hand.

When the hoods 16 have reached the lower position shown in FIG. 2, the supply of electrolyte from the conduit 23 and distributor 4 into the conductors or conduits 3 is initiated, suitable control devices for this purpose being well known and requiring no discussion. The electrolyte now flows at a constant supply pressure of 1 atm. from the conduit 23 into the distributor 4 and from there via the conduits 3 to the respective working electrodes 13 of the six working stations. The flow passages in the working stations are clearly visible, and the direction of flow of the electrolyte through the working electrodes, the working gap between the same and the workpiece 15, and in the space surrounded by the respective hoods 16, is shown by the arrows in FIG. 2. Because of the throttling effect it experiences in the working electrode 13 the electrolyte undergoes a slight pressure reduction and flows at a speed of approximately 0.8 atm. into the space 24 surrounded by the hood 16 exteriorly of the workpiece and of the working electrode 13. This space 24 becomes filled with electrolyte within a certain period of time, for instance approximately 3 seconds. From this space 24, which in the illustrated exemplary embodiment has a volumetric content of approximately 700 cm.³, the electrolyte flows outwardly through the annular gap 22, and on leaving the gap its pressure drops to atmospheric pressure. After the time required for complete filling of the space 24 with electrolyte, that is in the illustrated embodiment approximately 3 seconds after the hoods 16 have reached their lower position shown in FIG. 2, a direct current of 15.5 volts is supplied between working electrode 13 and workpiece 15, the manner in which this is accomplished being known in the art. Now, a current of approximately 500 amperes at a current density of approximately 0.25 a./mm.² will flow between the working electrode 13 and the workpiece 15, and during a period of 24 seconds grooves of approximately 0.3 mm. depth will be formed in the teeth of the workpiece 15 in the illustrated embodiment.

This formation of the grooves takes place simultaneously on the teeth of all of the workpieces 15, that is the workpieces in all of the six working stations. However, if one or more of the working stations is for any reason not provided with a workpiece 15, the hood 16 of the working station or stations in question in effect simulates the presence of a workpiece, due to the throttling action effected by the annular gap 22. The pressure drop of the electrolyte within the working electrode 13 is only approximately 0.1 atm. in a working station where no workpiece 15 is present, so that the electrolyte in the space 24 of this working station is at a pressure of approximately 0.9 atm. This means that in such a working station the difference in electrolyte pressure with respect to a working station where a workpiece 15 is in fact present, is only approximately 0.1 atm.; this small pressure difference does not disadvantageously influence the proper operation of the remaining working stations where a workpiece is present.

It is pointed out that the above specific values were experimentally determined with an annular gap 22 having a width of 2/10 mm., with the inner diameter of the hoods 16 being 122 mm. Evidently, these are values which have been mentioned here only in order to facilitate an understanding of the present invention and they are not to be considered limiting in any sense whatsoever. These values will all vary if any of them varies and are therefore to be considered only as illustrative.

The apparatus of the present invention will thus be seen to achieve its desired basic objective, namely to permit the processing of a plurality of workpieces simultaneously under conditions which do not vary—or do not vary to a disadvantageously significant extent—even if one or more of the processing stations during any given cycle of operation is not supplied with a workpiece and does not act upon such a workpiece. The pressure of the electrolyte in all working stations will remain at least substantially constant, even if only one of the several working stations is provided with a workpiece. This assures that a uniform electrochemical removal of the workpiece (anode) material is obtained so that grooves or other recesses or apertures can be produced in workpieces with precisely defined contours without requiring the utilization of expensive regulating arrangements for maintaining the electrolyte pressure constant, regulating arrangements which in addition to being expensive are also subject to the danger of breakdown. In addition it is an advantage of the present invention that the covers can be so constructed—and in the illustrated embodiment the hoods 16 are in fact so constructed—that they can intersect electrolyte which issues or bursts out of the working electrode after contact with the workpiece.

It will be understood that each of the elements described above, or two or more together, may also find a useful application in other types of applications differing from the types described above.

While the invention has been illustrated and described as embodied in an apparatus for the simultaneous electrochemical processing of a plurality of metallic workpieces, it is not intended to be limited to the details shown.

Without further analysis, the foregoing will so fully reveal the gist of the present invention that others can by applying current knowledge readily adapt it for various applications without omitting features that from the standpoint of prior art fairly constitute essential characterisics of the generic or specific aspects of this invention and therefore, such adaptations should and are intended to be comprehended within the meaning and range of equivalence of the following claims.

What is claimed as new and desired to be secured by Letters Patent is set forth in the appended claims:

1. In an electrochemical machining apparatus for the simultaneous electrochemical processing of a plurality of metallic workpieces, a combination comprising a plurality of working stations each having a working electrode, holding means for holding a metallic workpiece in predetermined orientation relative to said working electrode, and passage means for conducting a liquid electrolyte into contact with said electrode and workpiece; a source of supply for supplying liquid electrolyte at a predetermined level of pressure to said passage means of all of said working stations simultaneously; and control means associated with each of said working stations and operative for maintaining the pressure of electrolyte in said passage means at least substantially at said predetermined level irrespective of the presence or absence of a workpiece at the working station.

2. In an apparatus as defined in claim 1, each of said working stations having an electrolyte outlet; and wherein said control means determines the cross-sectional area of said electrolyte outlet.

3. In an apparatus as defined in claim 1, said control means being operative for maintaining the pressure of electrolyte in said passage means within substantially 0.1 atmosphere of said predetermined pressure.

4. In an apparatus as defined in claim 1, said working stations each having an electrode mount comprising the respective working electrode and provided with said electrolyte outlet; and wherein said control means comprises a cover movable with reference to said electrode mount to and from a position in which it determines the cross-sectional area of said electrolyte outlet.

5. In an apparatus as defined in claim 4, wherein said cover is configurated for intercepting electrolyte after contact of the latter with the respective workpiece.

6. In an apparatus as defined in claim 4, said electrode mount having an upwardly directed surface bounded by a peripheral edge over which electrolyte can flow off and which constitutes said outlet; and wherein said cover is a downwardly open hood mounted above said mount and having a lower margin which defines with said peripheral edge an annular flow gap for said electrolyte when said hood is in said position.

7. In an apparatus as defined in claim 6, wherein said hood is cylindrical and has an inner diameter of substantially 122 mm., and wherein said flow gap has a width of 2/10 mm.

8. In an apparatus as defined in claim 6, wherein said hood is composed at least substantially of hard polyvinylchloride.

References Cited
UNITED STATES PATENTS

| | | | |
|---|---|---|---|
| 3,594,298 | 7/1971 | Abt | 204—224 M |
| 3,409,535 | 11/1968 | Ross et al. | 204—275 |
| 3,677,928 | 7/1972 | Fleury | 204—224 M |

JOHN H. MACK, Primary Examiner

W. I. SOLOMON, Assistant Examiner

U.S. Cl. X.R.

204—275